United States Patent
Chen et al.

(10) Patent No.: US 7,448,788 B2
(45) Date of Patent: Nov. 11, 2008

(54) BACKLIGHT MODULE

(75) Inventors: Chien-Hsiang Chen, Chu Nan (TW);
Chia-Tsao Wu, Chu Nan (TW);
Der-Woei Hsaio, Chu Nan (TW);
Ping-Feng Hwang, Chu Nan (TW)

(73) Assignee: Coretronic Corporation, Chu Nan, Miao Li County (TW)

( * ) Notice: Subject to any disclaimer, the term of this patent is extended or adjusted under 35 U.S.C. 154(b) by 220 days.

(21) Appl. No.: 11/399,561

(22) Filed: Apr. 6, 2006

(65) Prior Publication Data
US 2006/0239026 A1    Oct. 26, 2006

(30) Foreign Application Priority Data
Apr. 21, 2005    (TW)    .............................. 94112703 A (51) Int. Cl.
*F21V 8/00*    (2006.01)
*F21V 7/04*    (2006.01)
(52) U.S. Cl. ................... 362/620; 362/606; 362/626
(58) Field of Classification Search ............. 362/606, 362/620, 626
See application file for complete search history.

(56) References Cited

U.S. PATENT DOCUMENTS 5,926,601 A * 7/1999 Tai et al. ................... 385/146
5,961,198 A * 10/1999 Hira et al. .................. 362/621
6,854,857 B2 * 2/2005 Hara et al. .................. 362/613

* cited by examiner

*Primary Examiner*—Sandra O'Shea
*Assistant Examiner*—James W Cranson
(74) *Attorney, Agent, or Firm*—Ohlandt, Greeley, Ruggiero & Perle, L.L.P.

(57) ABSTRACT

A backlight module includes a light guide plate and a light source. The light guide plate includes a first end portion, a second end portion, a middle portion between the first and second end portions, a top face extending from the first end portion to the second end portion, a bottom face extending from the first end portion to the second end portion, a light entrance face interconnecting the top and bottom faces at the first end portion, and a plurality of prismatic strips formed on the bottom face. The prismatic strips have a lower density at the first end portion as compared to the middle portion. The density is defined as a total length of the prismatic strips per unit area of the bottom face. The light source is disposed adjacent to the light entrance face.

12 Claims, 7 Drawing Sheets

BACKLIGHT MODULE

CROSS-REFERENCE TO RELATED APPLICATION

This application claims priority of Taiwanese Application No. 094112703, filed on Apr. 21, 2005.

BACKGROUND OF THE INVENTION

1. Field of the Invention

The invention relates to a backlight module, more particularly to a backlight module which can provide a light output of uniform brightness.

2. Description of the Related Art

Figure 1:
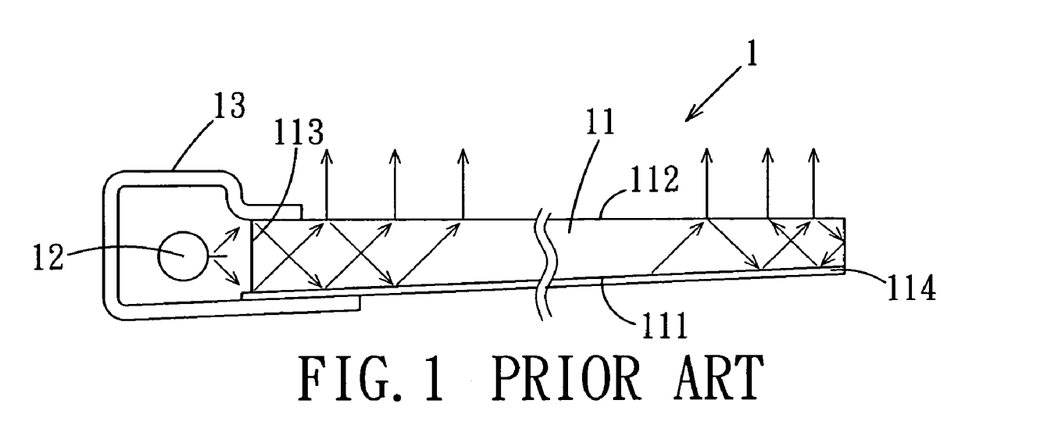
FIG. 1 is a schematic view of a conventional side-edge type of backlight module.

Referring to FIG. 1, a conventional side-edge and single-light-source type of backlight module 1 includes a light guide plate 11 in a shape of a wedge, a light source 12 provided adjacent to the light guide plate 11, a reflecting cover 13 covering the light source 12, and a reflector 114 disposed below the light guide plate 11. The light guide plate 11 includes a bottom face 111 having serrated microstructures (not shown) formed thereon, a top face 112, and a light entrance face 113 interconnecting the top and bottom faces 112, 111 and disposed adjacent to the light source 12. A light emitted by the light source 12 and reflected by the cover 13 enters the light guide plate 11 and exits from the top face 112 after undergoing total internal reflections.

However, the top face 112 of the light guide plate 11 has a relatively bright light output at an area adjacent to the light source 12 as compared to a remaining area of the top face 112 of the light guide plate 11. The light brightness of the top face 112 of the light guide plate 11 is not uniform, which in turn affects the quality of an image.

Figure 2:
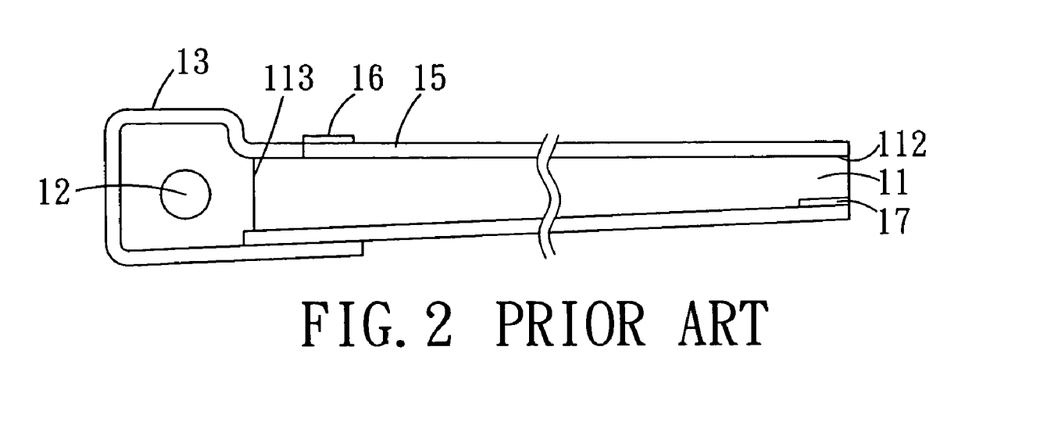
FIG. 2 is a schematic view of another conventional side-edge type of backlight module.

Referring to FIG. 2, in order to overcome the aforesaid disadvantage, a diffusion sheet 15 printed with a specific film 16 thereon is mounted on the top face 112 of the light guide plate 11. However, the cost for the specific film 16 is high. Therefore, a production cost is increased.

Additionally, the area of the top face 112 of the light guide plate 11 remote from the light source 12 can also have a relatively bright light output. While a shielding sheet 17 can be used to overcome the problem, it is not easy to install the shielding sheet 17 during the production of the backlight module 1, and the production cost is also increased thereby.

SUMMARY OF THE INVENTION

Therefore, it is an object of the present invention to provide a backlight module which can provide a light output of uniform brightness.

In one aspect of this invention, a backlight module includes a light guide plate and a light source. The light guide plate includes a first end portion, a second end portion, a middle portion between the first and second end portions, a top face extending from the first end portion to the second end portion, a bottom face extending from the first end portion to the second end portion, a light entrance face interconnecting the top and bottom faces at the first end portion, and a plurality of prismatic strips formed on the bottom face. The prismatic strips have a lower density at the first end portion as compared to the middle portion. The density is defined as a total length of the prismatic strips per unit area of the bottom face. The light source is disposed adjacent to the light entrance face.

In another aspect of this invention, a backlight module includes a light guide plate and a light source. The light guide plate includes a first end portion, a second end portion, a middle portion between the first and second end portions, a top face extending from the first end portion to the second end portion, a bottom face extending from the first end portion to the second end portion, a light entrance face interconnecting the top and bottom faces at the first end portion, and a plurality of prismatic strips formed on the bottom face. The prismatic strips have a lower density at the second end portion as compared to the middle portion. The density is defined as a total length of the prismatic strips per unit area of the bottom face. The light source is disposed adjacent to the light entrance face.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 3:
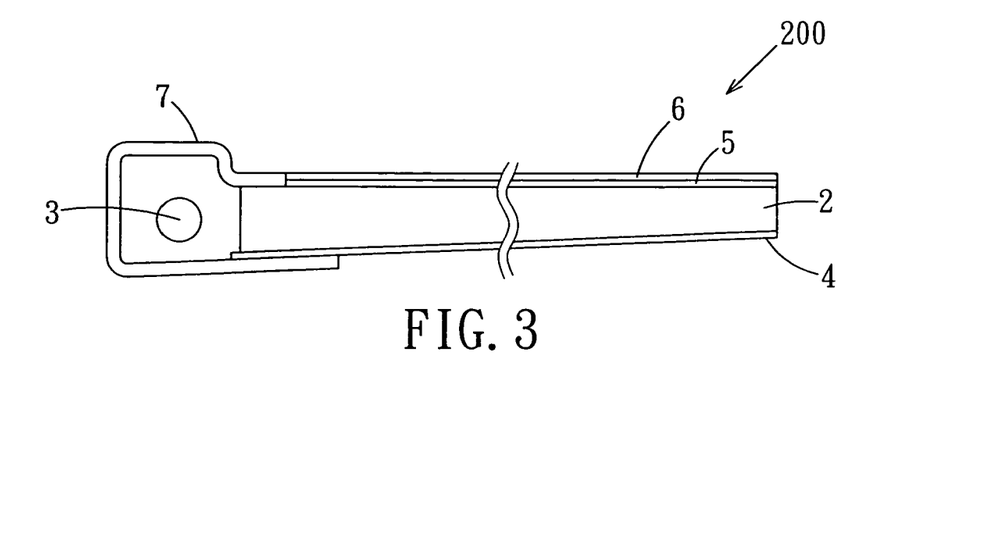
FIG. 3 is a schematic view of the first preferred embodiment of a backlight module according to this invention.
Figure 4:
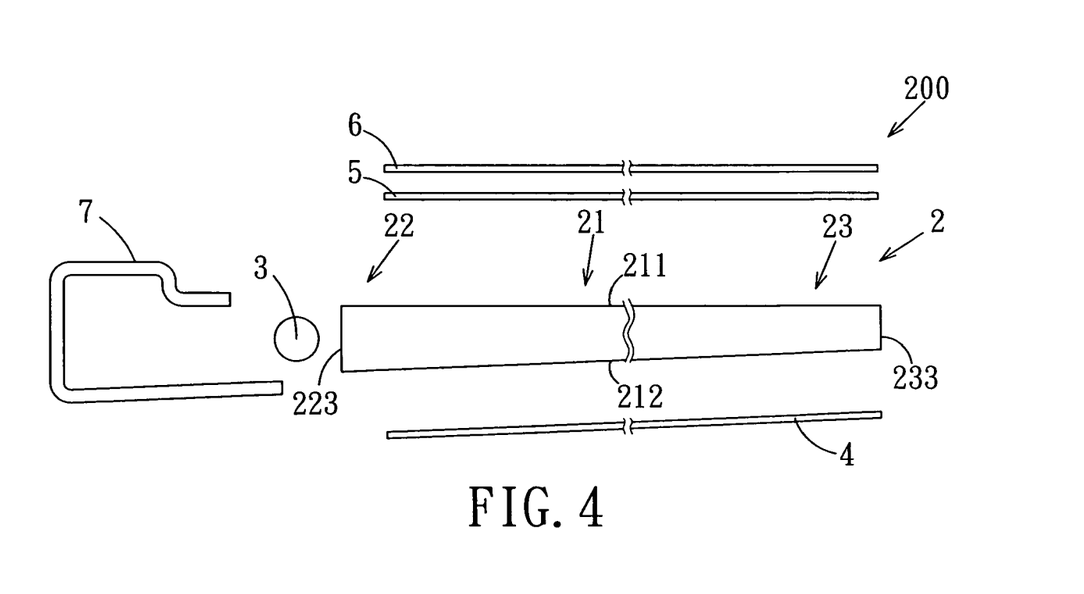
FIG. 4 is an exploded schematic view of the first preferred embodiment.
Figure 5:
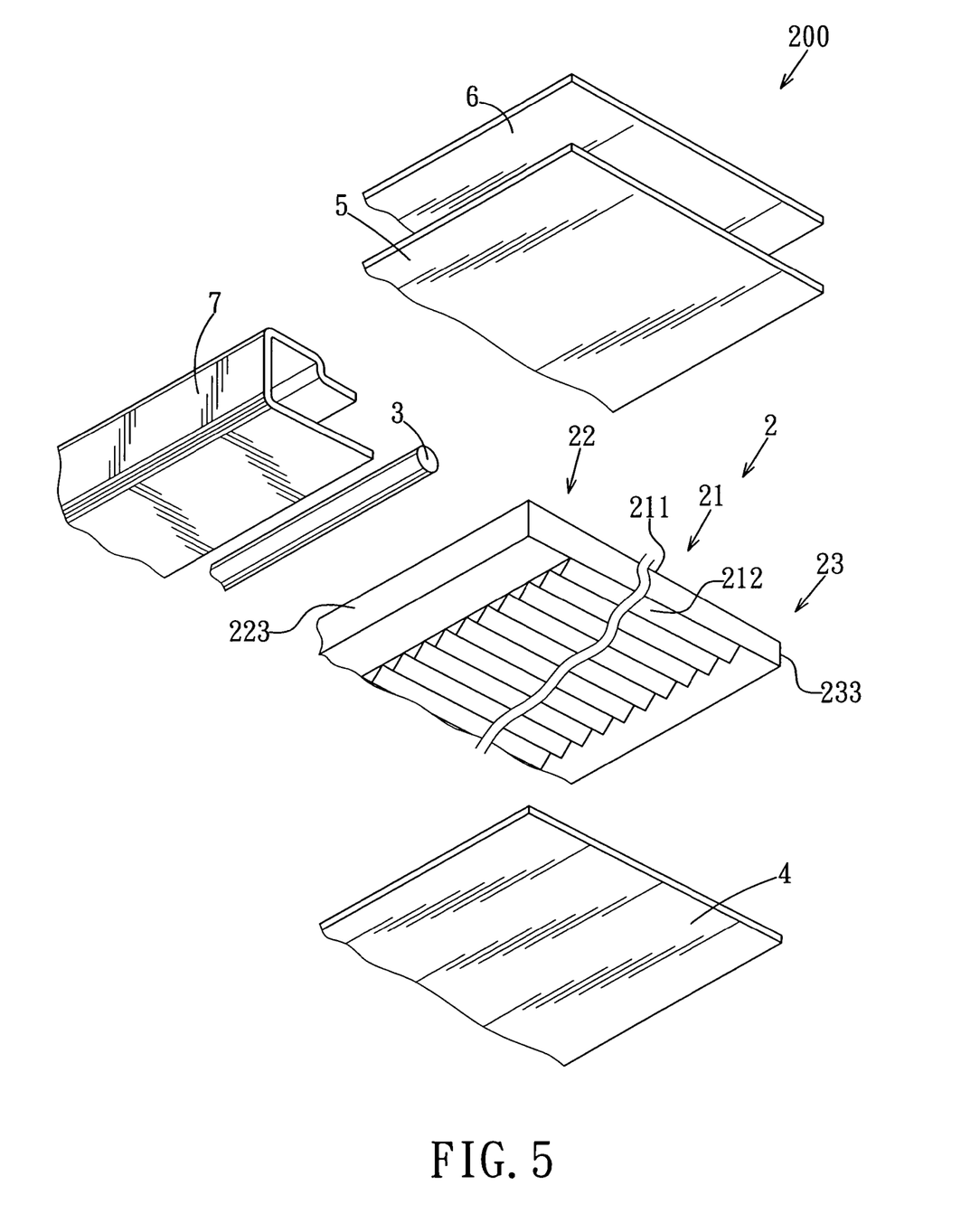
FIG. 5 is an exploded perspective view of the first preferred embodiment.

Referring to FIGS. 3, 4, and 5, the first preferred embodiment of a backlight module 200 according to this invention is shown to be illustrated as a side-edge type of backlight module suitable for application to a liquid crystal display, and includes a light guide plate 2, a light source 3, a reflector 4, a prism sheet 5, a diffusion sheet 6, and a reflecting cover 7.

The light guide plate 2 has a wedge-shaped configuration, and includes a first end portion 22, a second end portion 23, a middle portion 21 between the first and second end portions 22, 23, a top face 211 extending from the first end portion 22 to the second end portion 23, a bottom face 212 extending from the first end portion 22 to the second end portion 23, a light entrance face 223 interconnecting the top and bottom faces 211, 212 at the first end portion 22, and a plurality of prismatic strips formed on the bottom face 212. The prismatic strips have a lower density at the first end portion 22 as compared to the middle portion 21. The density is defined as a total length of the prismatic strips per unit area of the bottom face 212. In this preferred embodiment, the prismatic strips are in the form of V-shaped serrations and extend substantially along a longitudinal direction transverse to the first light entrance face 223. The bottom face 212 is flat and is free of the prismatic strips at the first end portion 22, which can be accomplished by polishing or the like. The second end portion 23 includes a light reflecting face 233 interconnecting the top and bottom faces 211,212 and distal from the middle portion 21. The density of the prismatic strips is lower at the second end portion 23 as compared to the middle portion 21. In this preferred embodiment, the bottom face 212 is flat and is free of the prismatic strips at the second end portion 22.

The light source 3 is disposed adjacent to the light entrance face 223. The light emitted by the light source 3 is transmitted into the light guide plate 2 through the light entrance face 223, and exits from the top face 211 of the light guide plate 2. The light source 3 suitable for the present invention is a cold cathode fluorescent lamp, a light-emitting diode, and the like. The reflecting cover 7 covers the light source 3 so as to reflect the light incident thereon into the light guide plate 2.

The reflector 4 reflects the light impinging thereon back into the light guide plate 2 so as to improve the utilization efficiency of the light. The prism sheet 5 is provided on the top face 211 of the light guide plate 2 so as to increase the light brightness. The diffusion sheet 6 is provided on the prism sheet 5 to diffuse the light through the prism sheet 5 so as to improve the uniformity of the light brightness.

When the backlight module 200 is in use, the light emitted by the light source 3 is transmitted into the light guide plate 2 through the light entrance face 223. The reflecting cover 7 reflects the light incident thereon into the light guide plate 2 so as to improve the utilization efficiency of the light. The light transmitted into the light guide plate 2 is guided to and exits from the top face 112 after undergoing multiple total internal reflections. Furthermore, the light reaching the prismatic strips of the bottom face 212 of the light guide plate 2 is reflected in the light guide plate 2. The light reaching on the reflector 4 through the bottom face 212 of the light guide plate 2 is reflected back into the light guide plate 2 so as to improve the utilization efficiency of the light. Finally, the light exits from the backlight module 200 through the top face 211 of the light guide plate 2, the prism sheet 5, and the diffusion sheet 6. Since the bottom face 212 of the light guide plate 2 is flat and is free of the prismatic strips at the first and second end portions 22, 23, the light brightness can be reduced on the top face 211 at the first and second end portions 22, 23. Therefore, the disadvantage of having a relatively bright light output at the area adjacent to the light source 12 as compared to the remaining area of the top face 112 of the light guide plate 11 as encountered in the aforesaid prior art can be overcome. Accordingly, a uniform brightness of light output can be obtained from the backlight module 200 of this invention.

In the aforesaid first preferred embodiment, the bottom face 212 is flat and is free of the prismatic strips at the first and second end portions 22, 23 so as to avoid brighter areas from being formed on the top face 211 at the first and second end portions 22, 23. However, it is not necessary for the bottom face 212 to be flat and to be free of the prismatic strips at the first and second end portions 22, 23 simultaneously. That is to say, the bottom face 212 can have the prismatic strips at one of the first and second end portions 22, 23.

Figure 6:
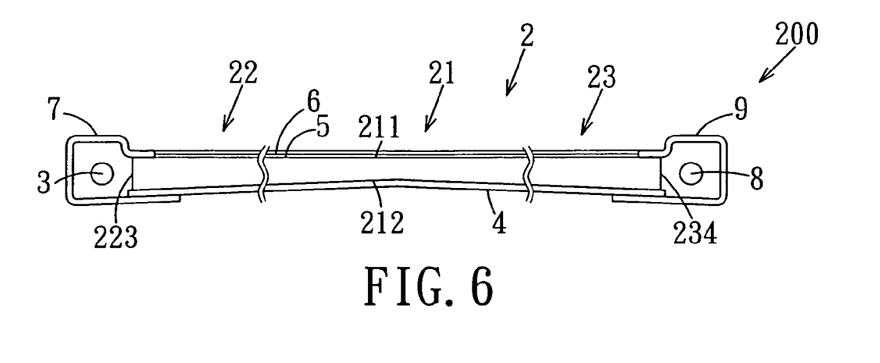
FIG. 6 is a schematic view of the second preferred embodiment of a backlight module according to this invention.
Figure 7:
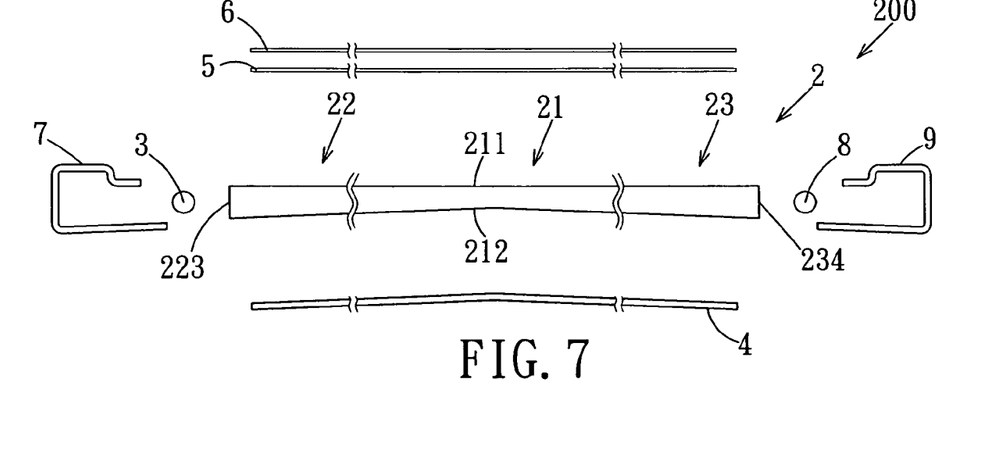
FIG. 7 is an exploded schematic view of the second preferred embodiment.
Figure 8:
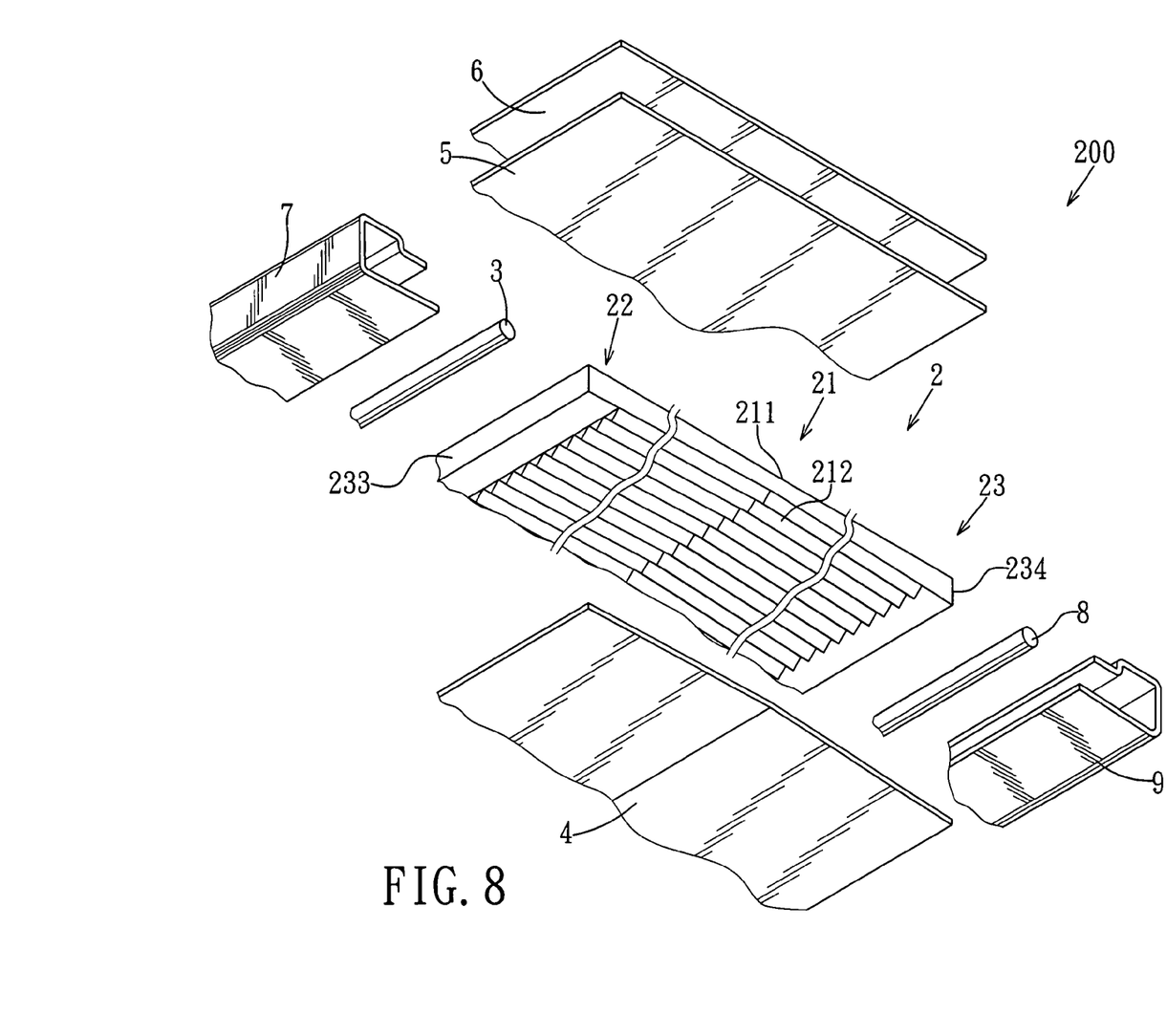
FIG. 8 is an exploded perspective view of the second preferred embodiment.

Referring to FIGS. 6, 7, and 8, the second preferred embodiment of a backlight module 200 according to this invention is shown to be similar to the first preferred embodiment in construction. However, in the second preferred embodiment, the light guide plate 2 is configured to have a double-wedge shape. That is to say, the thickness of the light guide plate 2 decreases gradually from the first end portion 22 to the middle portion 21 and from the second end portion 23 to the middle portion 21. The light guide plate 2 includes a first light entrance face 223 interconnecting the top and bottom faces 211, 212 at the first end portion 22, and a second light entrance face 234 interconnecting the top and bottom faces 211, 212 at the second end portion 22. The backlight module 200 of the second preferred embodiment includes a first light source 3 disposed adjacent to the first light entrance face 223, a second light source 8 disposed adjacent to the second light entrance face 234, and first and second reflecting covers 7, 9 that cover the first and second light sources 3, 8, respectively. The light emitted by the first and second light sources 3, 8 is transmitted into the light guide plate 2 through the first and second light entrance faces 223, 234. Furthermore, in the second preferred embodiment, the bottom face 212 is also flat and is free of the prismatic strips at the first and second end portions 22, 23. Alternatively, the bottom face 212 can have the prismatic strips at one of the first and second end portions 22, 23.

Figure 9:
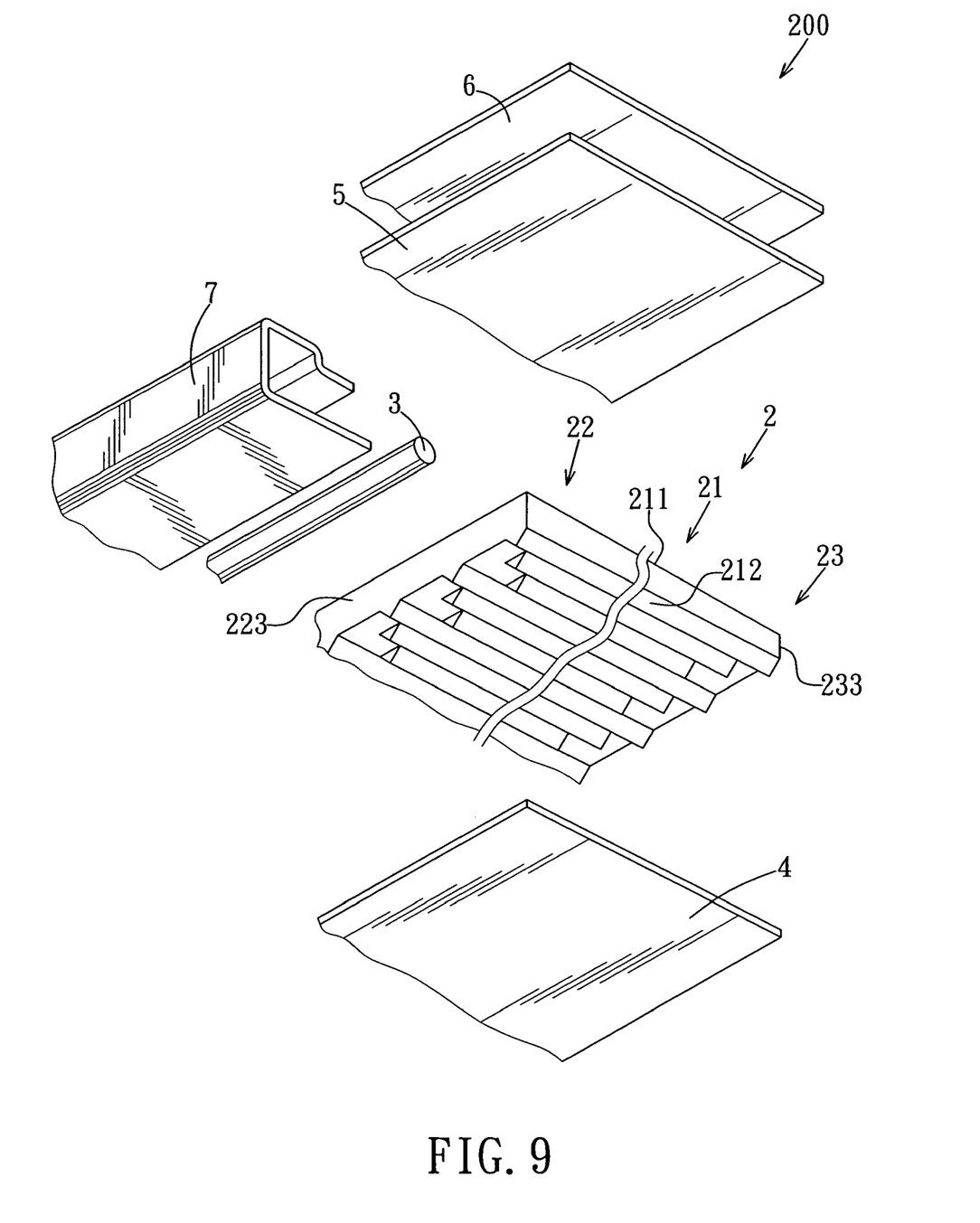
FIG. 9 is an exploded perspective view of the third preferred embodiment of a backlight module according to this invention.
Figure 10:
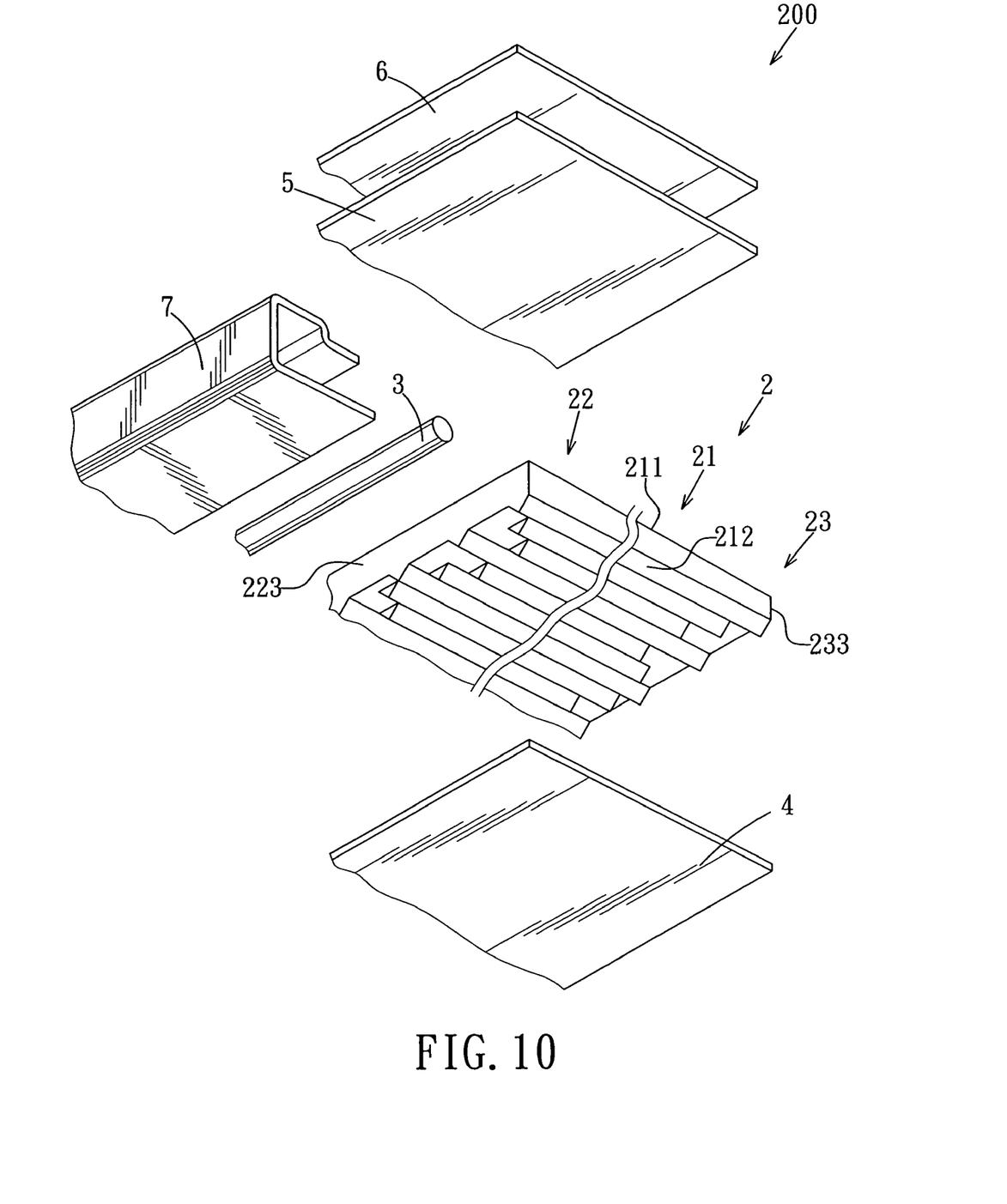
FIG. 10 is an exploded perspective view of the fourth preferred embodiment of a backlight module according to this invention.

Referring to FIGS. 9 and 10, the third and fourth preferred embodiments of a backlight module 200 according to this invention are shown to be similar to the first preferred embodiment. However, in these embodiments, the prismatic strips have different lengths at the first and second end portions 22, 23. The prismatic strips at the first and second end portions 22, 23 can be configured in a regular arrangement (as shown in FIG. 9) or an irregular arrangement (as shown in FIG. 10). Alternatively, according to the specific requirement, the light guide plate 2 can be designed to have a configuration in which one of the first and second portions 22, 23 of the light guide plate 2 is flat and is free of the prismatic strips on the bottom face 212, whereas the other of the first and second portions 22, 23 of the light guide plate 2 has prismatic strips of different lengths on the bottom face 212. Furthermore, the light guide plate 2 can be designed to have a configuration in which one of the first and second end portions 22, 23 of the light guide plate 2 has a prismatic strip density identical to that of the middle portion 21, and the other of the first and second end portions 22, 23 of the light guide plate 2 has prismatic strips of different lengths on the bottom face 212. The backlight module 200 illustrated in the third or fourth preferred embodiment can be further modified to include two light sources and to have a light guide plate similar to that illustrated in the second preferred embodiment.

In view of the aforesaid, the backlight module 200 of this invention can overcome the disadvantages encountered in the prior art. Furthermore, the configuration of the light guide plate 2 can be designed flexibly according to the specific requirements.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A backlight module comprising:
a light guide plate including a first end portion, a second end portion, a middle portion between said first and second end portions, a top face extending from said first end portion to said second end portion, a bottom face extending from said first end portion to said second end portion, a first light entrance face interconnecting said top and bottom faces at said first end portion, and a plurality of prismatic strips formed on said bottom face, said prismatic strips having a lower density at said first end portion as compared to said middle portion, said density being defined as a total length of said prismatic strips per unit area of said bottom face; and a first light source disposed adjacent to said first light entrance face, wherein said prismatic strips are in the form of serrations, and extend substantially along a longitudinal direction transverse to said first light entrance face.

2. The backlight module as claimed in claim 1, wherein said bottom face is flat and is free of said prismatic strips at said first end portion.

3. The backlight module as claimed in claim 1, wherein said prismatic strips have different lengths at said first end portion.

4. The backlight module as claimed in claim 1, wherein said second end portion includes a light reflecting face interconnecting said top and bottom faces and distal from said middle portion, said density of said prismatic strips being lower at said second end portion as compared to said middle portion.

5. The backlight module as claimed in claim 4, wherein said bottom face is flat and is free of said prismatic strips at said second end portion.

6. The backlight module as claimed in claim 4, wherein said prismatic strips have different lengths at said second end portion.

7. The backlight module as claimed in claim 1, further comprising a second light source opposite to said first light source, said light guide plate further including a second light entrance face interconnecting said top and bottom faces and disposed adjacent to said second light source, said prismatic strips having a lower density at said second end portion as compared to said middle portion.

8. The backlight module as claimed in claim 7, wherein said bottom face is flat and is free of said prismatic strips at said second end portion.

9. The backlight module as claimed in claim 7, wherein said prismatic strips have different lengths at said second end portion.

10. A backlight module comprising:

a light guide plate including a first end portion, a second end portion, a middle portion between said first and second end portions, a top face extending from said first end portion to said second end portion, a bottom face extending from said first end portion to said second end portion, a light entrance face interconnecting said top and bottom faces at said first end portion, and a plurality of prismatic strips formed on said bottom face, said prismatic strips having a lower density at said second end portion as compared to said middle portion, said density being defined as a total length of said prismatic strips per unit area of said bottom face; and a light source disposed adjacent to said light entrance face, wherein said prismatic strips are in the form of serrations and extend substantially along a longitudinal direction transverse to said light entrance face.

11. The backlight module as claimed in claim 10, wherein said bottom face is flat and is free of said prismatic strips at said second end portion.

12. The backlight module as claimed in claim 10, wherein said prismatic strips have different lengths at said second end portion.

* * * * *